United States Patent [19]
Tallent et al.

[11] 3,993,982
[45] Nov. 23, 1976

[54] SEQUENCE CONTROL UNIT FOR A TELEVISION TIME BASE CORRECTOR

[75] Inventors: Michael W. Tallent, San Jose; Lee E. Scaggs, Mountain View; Allan L. Swain, Palo Alto; Ronnie M. Harrison; William B. Hendershot, III, both of San Jose, all of Calif.

[73] Assignee: Consolidated Video Systems, Inc., Santa Clara, Calif.

[22] Filed: Jan. 10, 1975

[21] Appl. No.: 540,024

Related U.S. Application Data

[62] Division of Ser. No. 381,463, July 23, 1973, Pat. No. 3,860,952.

[52] U.S. Cl............................................. 340/173 R
[51] Int. Cl.² ....................... G11C 7/00; G11C 9/00
[58] Field of Search ...................... 340/173 R, 172.5

[56] References Cited
UNITED STATES PATENTS
3,812,473   5/1974   Tucker............................. 340/172.5

*Primary Examiner*—Stuart N. Hecker
*Attorney, Agent, or Firm*—Townsend and Townsend

[57] ABSTRACT

A sequence control unit for a digital video time base corrector used to process television signals to remove time base errors introduced during signal recording, reproducing, or transmission. In the time base corrector, incoming video signals are converted from analog to digital form, temporarily stored in a memory unit at a clocking rate which varies in a manner generally proportional to the time base errors, and the stored signals are fetched at a standard clocking rate. The sequence control unit controls contemporaneous storing and fetching from different portions of the memory unit and includes circuitry for preventing application of both store and fetch signals to the same memory unit portion when the accumulated time base error would cause such an overlap condition.

3 Claims, 2 Drawing Figures

SEQUENCE CONTROL UNIT FOR A TELEVISION TIME BASE CORRECTOR

This is a divisional of application Ser. No. 381,463 filed July 27, 1973 for "Television Signal Time Base Corrector," now U.S. Pat. No. 3,860,952, the disclosure of which is hereby incorporated by reference.

SUMMARY OF THE INVENTION

The invention comprises a sequence control unit for a digital video time base corrector used to process video signals to remove time base errors, the corrector including a memory unit with a plurality of memory portions each capable of storing a plurality of horizontal lines of video information. In its most general aspect, the sequence control unit controls the selection of each memory unit portion for writing and reading in such a manner that double clocking of a single memory unit portion which marginally occurs at the extreme boundaries of the correction range afforded by the associated time base corrector is quickly relieved. In the preferred embodiment, the invention includes write enable means adapted to be coupled to a first reference input signal for sequentially generating mutually exclusive write enable signals each specifying a different one of a plurality of memory unit portions for a store operation; means coupled to the write enable means and having an input adapted to be coupled to a first clock signal train for coupling the first clock signal train to different ones of the memory unit portions in accordance with the write enable signals; read enable means adapted to be coupled to a second reference input signal for sequentially generating mutually exclusive read enable signals each specifying a different one of the memory unit portions for a fetch operation; means coupled to the read enable means and having an input adapted to be coupled to a second clock signal train for coupling the second clock signal train to different ones of the memory unit portions in accordance with the read enable signals; means for detecting an overlap condition in which the write and read enable signals specify the same one of the memory unit portions for contemporaneous store and fetch operations; and means responsive to the detecting means for presetting the read enable means to generate a read enable signal specifying a different one of the memory unit portions whenever the overlap condition is detected.

The read enable means includes a counter for dividing the second clock input signal to define a fetch interval, and the presetting means includes means for presetting the counter to a state defining a fraction of the fetch interval.

For a fuller understanding of the objects and advantages of the invention, reference should be had to the following detailed description taken in conjunction with the accompanying drawings.

SEQUENCE CONTROL UNIT

Figure 1:
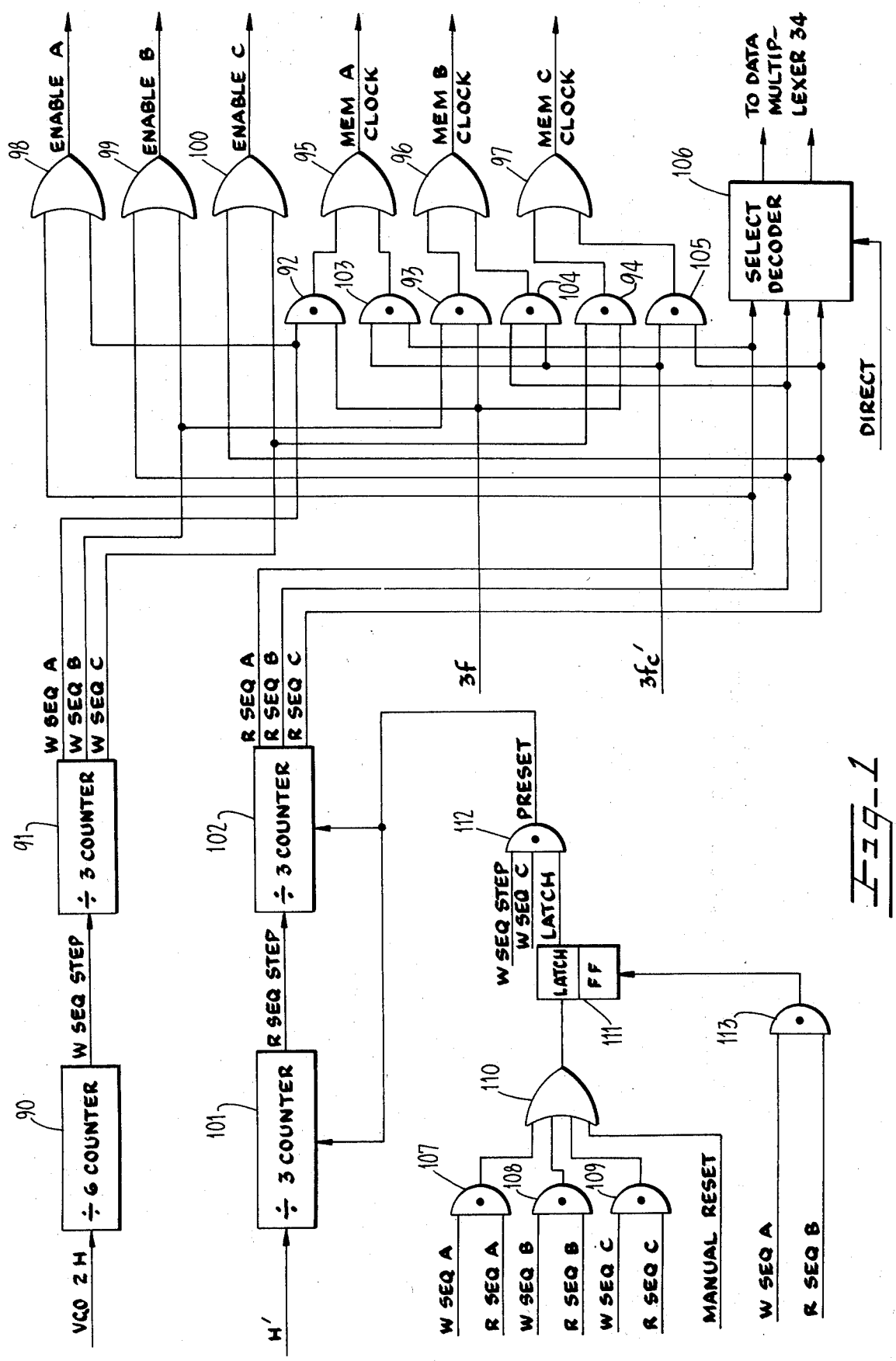
FIG. 1 is a schematic diagram illustrating the sequence control unit of the preferred embodiment.

Sequence control unit 28 is illustrated in FIG. 1. VCO 2H pulses are coupled to the input of a conventional divide-by-six counter 90 which generates a pulse termed W SEQ STEP for each three lines of video information. Successive W SEQ STEP pulses are coupled to a conventional divide-by-three counter 91. The three stages of divide-by-three counter 91 are tapped to provide three enabling signals termed W SEQ A, W SEQ B, and W SEQ C. These three signals are each coupled to a different first input of three separate AND gates 92–94. The other inputs to each of AND gates 92–94 is a 3 $f$ signal obtained from input VCO circuit 27. The outputs of AND gates 92–94 are coupled through three separate OR gates 95, 96, 97 to the clock inputs of memory units 30–32 respectively. W SEQ A, W SEQ B and W SEQ C signals are also coupled to a first input of a different one of three OR gates 98–100, respectively, the outputs of which provide the ENABLE A, ENABLE B and ENABLE C control signals for memory units 30–32.

H' pulse signals from switching network 36 are coupled to the input of a conventional divide-by-three counter 101 which produces an output signal pulse for each third horizontal line of video information, termed R SEQ STEP. The R SEQ STEP pulses are coupled to the input of a conventional divide-by-three counter 102. The three stages of divide-by-three counter 102 are tapped to provide three enabling signals termed R SEQ A, R SEQ B and R SEQ C. These three outputs are coupled to a different first input of three separate AND gates 103–105. The remaining input to AND gates 103–105 is 3 $f_c'$ signal obtained from output VCO circuit 33. The output of AND gates 103-105 are coupled through OR gates 95–97 to the clock inputs of memory units 30–32, respectively. R SEQ A, A SEQ B and R SEQ C signals are also coupled to the second input of a different one of OR gates 98–100, respectively.

R SEQ A, R SEQ B and R SEQ C signals are further coupled to a select decoder 106 which provides a 2-bit digital character to data multiplexer 37 for specifying the coupling of one of memory units 30–32 to data multiplexer 37, or the direct analog-to-digital converter 23 to data multiplexer 37 path. This direct path is provided to enable the digitized video to by-pass the time base error correcting store-fetch portion of the system for comparison purposes and is selected by the generation of a DIRECT signal by an operator accessible control (not shown).

Figure 2:
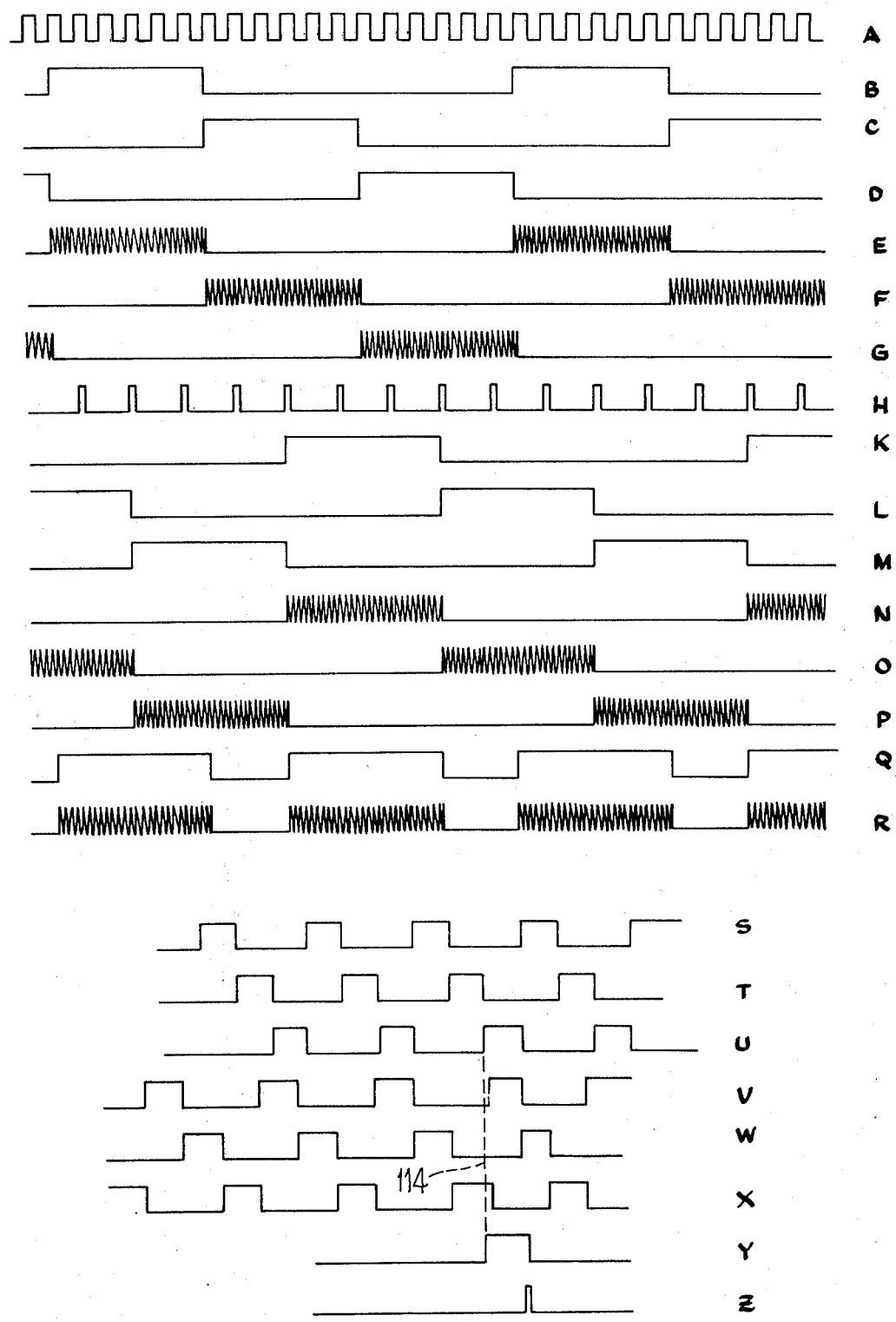
FIG. 2, including A through Z (omitting I and J), is a waveform diagram illustrating the operation of the sequence control unit of FIG. 1.

FIG. 2 illustrates various waveforms useful in understanding the operation of sequence control unit 28. For purposes of clarity waveform A, which illustrates VCO 2H signal from input VCO circuit 27, is represented as a constant frequency signal, i.e., a signal having no time-base error in frequency, but with a fixed phase error with respect to H' signal from switching network 36, the latter signal being respesented by waveform H.

With reference to FIGS. 1 and 2, in operation VCO 2H signals (waveform A) are divided down by counters 90 and 91 to sequentially generate the W SEQ A, W SEQ B and W SEQ C signals (waveforms B–D). These signals are coupled via OR gates 98–100 to sequentially enable a different one of memory units 30–32 for writing data therein. The 3 $f$ clock signals are coupled during any given write interval through one of AND gates 92–94 and OR gates 95–97 (waveforms E–G) to a selected one of memory units 30–32 in order to write successive lines of digital information from analog-to-digital converter 23 into the selected memory unit. After three lines have been written into a specified memory, the adjacent memory is specified by the output of counter 91 and the next three lines of information are written therein.

Contemporaneously with the write operation, counters 101 and 102 divide down the H' timing pulses (waveform H) and sequentially generate the R SEQ A, R SEQ B and R SEQ C signals (waveforms K–M). These signals are coupled via OR gates 98–100 to sequentially enable a different one of memory units 30–32 for fetching data therefrom. The $3 f_c'$ read clock signals are coupled during any given read interval through one of AND gates 103–105 and OR gates 95–97 (waveforms N–P) to a selected one of memory units 30–32. The combined ENABLE and clock signals coupled to memory unit 30 via OR gates 98, 95, respectively, are illustrated by waveforms Q and R. As shown, memory unit 30 is cyclically enabled for writing of data therein and fetching of data therefrom by the ENABLE signals (waveform Q) generated from successive W SEQ A and R SEQ A signals. When enabled, memory unit 30 is alternately clocked by $3 f$ write clock signals and $3 f_c'$ read clock signals. As will be evident to those skilled in the art, the separate write and read clock signals are not mutually synchronous. Since the combined ENABLE and clock signals coupled to memory units 31 and 32 are substantially similar to the memory unit 30 ENABLE and clock signals, they are omitted from FIG. 8 to avoid prolixity.

Waveforms A–R illustrate the optimum condition in which the write sequence enable signals (waveforms B–D) are centered between the read sequence enable signals (waveforms K–M). When sequence control unit 28 is operating in this state, a maximum time base error of ± 1.5 lines between successive lines of video can be corrected by the invention.

The R SEQ A, R SEQ B and R SEQ C signals are also individually decoded by select decoder 104 to 2-bit SELECT signals for synchronizing the operation of data multiplexer 37 with the fetching of data from one of memory units 30–32. For economy of space, the SELECT signals are omitted from FIG. 8.

The above described contemporaneous write-read operation proceeds as described unless the time-base errors exceed the maximum correctable deviation, which results in the generation of overlapping write enable and read enable signals for a single memory unit. When this condition obtains, in order to remedy double clocking of the memory unit by the separate write and read clocks, a special preset circuit presets the operation of sequence control unit 28 in the following fashion. The individual W SEQ A, W SEQ B, W SEQ C and R SEQ A, R SEQ B and R SEQ C outputs from counters 91 and 102 are paired at the inputs to individual AND gates 107–109. The outputs of AND gates 107–109 are coupled via an OR gate 110 tp the input of a latch flip-flop 111, along with a manual reset signal obtained from an operator accessible manual switch (not shown). The output of latch flip-flop 111 is coupled to one input of an AND gate 112 along with W SEQ STEP and W SEQ C signal lines. The output of AND gate 112 is coupled to the preset inputs of counters 101, 102. W SEQ A and R SEQ B signals are coupled via AND gate 113 to the reset input of latch flip-flop 109.

In operation, whenever any pair of write and read enable signals are present at the input of one of AND gates 105, 107, indicating an invalid attempt to read and write contemporaneously from the same memory unit, the output from that AND gate sets latch flip-flop 111. When latch flip-flop 111 is set, latch signal appears at one input to AND gate 112 thereby conditioning this element. Upon termination of the next W SEQ C signal, which immediately preceeds the generation of W SEQ A signal, AND gate 112 generates a preset signal which presets counters 100, 102 to a combined count representing one third of the total length of the R SEQ B interval.

Waveforms S–Z illustrate the operation of the preset circuit in response to overlap between W SEQ C and R SEQ C write and read enable signals. As illustrated in this Figure, W SEQ A, W SEQ B and W SEQ C write enable signals are represented by waveforms S–U. R SEQ A, R SEQ B and R SEQ C read enable signals are represented by waveforms V–X. For illustrative purposes, the write enable signals are all depicted as having a uniform period which is approximately 10% shorter than the uniformly depicted period of the read enable intervals. Thus as operation of the sequence control unit proceeds, the phase difference between the write enable intervals and the read enable intervals accumulates until the W SEQ C write enable signal overlaps with the R SEQ C read enable signal at the point indicated by lead line 114. When this overlapping condition obtains, latch flip-flop 111 is set by the output of AND gate 109 via OR gate 110, thereby conditioning AND gate 112. The output of latch flip-flop 111 is represented in FIG. 2 by waveform Y. Thereafter, at the end of the W SEQ C write enable interval, AND gate 112 generates a preset pulse represented by waveform Z thereby presetting counters 101, 102 to the above-noted advanced count. This results in the discarding of one half of one line of video information contained in the last one-thrid portion of memory unit 30 and a single line of video information contained in the first one-third portion of memory unit 31 but the visual effect of discarding this information is so negligible as to be unnoticeable for viewing purposes. As noted, latch flip-flop 111 is subsequently reset by the concurrence of W SEQ A and R SEQ B, thereby rearming the preset circuit for detection of a subseqent overlapping condition.

While the above provides a full and complete disclosure of the preferred embodiment various modifications, alternate constructions and equivalents may be employed without departing from the true spirit and scope of the invention. Therefore, the above description and illustrations should not be construed as limiting the scope of the invention, which is defined by the appended claims.

What is claimed is:

1. A sequence control unit for sequentially enabling a plurality of memory units for contemporaneous store and fetch operations at rates specified by first and second clock signal trains respectively, said sequence unit comprising:

write enable means adapted to be coupled to a first reference input signal for sequentially generating mutually exclusively write enable signals each specifying a different one of said memory units for a store operation;

means coupled to said write enable means and having an input adapted to be coupled to said first clock signal train for coupling said first clock signal train to different ones of said memory units in accordance with said write enable signals;

read enable means adapted to be coupled to a second reference input signal for sequentially generating mutually exclusive read enable signals each specifying a different one of said memory units for a fetch operation;

means coupled to said read enable means and having an input adapted to be coupled to said second clock signal train for coupling said second clock signal train to different ones of said memory units in accordance with said read enable signals;

means for detecting an overlap condition in which said write and read enable signals specify the same one of said memory units for contemporaneous store and fetch operations; and means responsive to said detecting means for presetting said read enable means to generate a read enable signal specifying a different one of said memory units whenever said overlap condition is detected.

2. The system of claim 1 wherein said read enable means include a counter for dividing said second reference input signal to define a fetch interval, and said presetting means includes means for presetting said counter to a state defining a fraction of said fetch interval.

3. The system of claim 2 wherein said fraction is ⅓.

* * * * *